(12) United States Patent
Wu et al.

(10) Patent No.: US 10,298,065 B2
(45) Date of Patent: May 21, 2019

(54) WIRELESS POWER TRANSFER WITH IMPROVED DEVICE IDENTIFICATION AND SIGNALING LINK SECURITY

(71) Applicant: Intel Corporation, Santa Clara, CA (US)

(72) Inventors: Yongwei Wu, Shanghai (CN); Ahmad Khoshnevis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 338 days.

(21) Appl. No.: 15/128,699

(22) PCT Filed: May 21, 2014

(86) PCT No.: PCT/CN2014/077985
§ 371 (c)(1),
(2) Date: Sep. 23, 2016

(87) PCT Pub. No.: WO2015/176246
PCT Pub. Date: Nov. 26, 2015

(65) Prior Publication Data
US 2017/0170687 A1    Jun. 15, 2017

(51) Int. Cl.
*H04L 21/00* (2006.01)
*H02J 50/12* (2016.01)
(Continued)

(52) U.S. Cl.
CPC ............ *H02J 50/12* (2016.02); *G06F 1/266* (2013.01); *H02J 7/025* (2013.01); *H02J 50/80* (2016.02);
(Continued)

(58) Field of Classification Search
CPC ...... H04W 4/80; H04L 9/3239; H04L 9/0643; G06F 1/266
See application file for complete search history.

(56) References Cited

U.S. PATENT DOCUMENTS

| 9,048,681 B2 | 6/2015 | Nowottnick |
| 2008/0045218 A1 | 2/2008 | Okochi et al. |

(Continued)

FOREIGN PATENT DOCUMENTS

| CN | 102299391 A | 12/2011 |
| CN | 103297086 A | 9/2013 |

(Continued)

OTHER PUBLICATIONS

Shinohara, "Power without wire", 2011, IEEE Microwave Magazine, ieeexplore.ieee.org (Year: 2011).*

(Continued)

*Primary Examiner* — Morshed Mehedi
(74) *Attorney, Agent, or Firm* — Grossman, Tucker, Perreault & Pfleger, PLLC (57) ABSTRACT

Generally, this disclosure provides systems, devices, methods and computer readable media for wireless power transfer with improved device identification and signaling security. A Power Receiving Unit (PRU) may include a receive resonator module to receive power from a Power Transmitting Unit (PTU) over an inductive resonant coupling link. The power may be modulated to provide signaling between the PRU and the PTU over the resonant coupling link. The PRU may also include a signaling link communication module to provide a second type of signaling between the PRU and the PTU over a wireless communication link. The PRU may further include a controller module to receive a random number, generated by the PTU, over the resonant coupling link; calculate an encoded response based on the random number and on an identifier of the PRU; and transmit the encoded response to the PTU over the wireless communication link, for verification by the PTU.

25 Claims, 8 Drawing Sheets

(51) Int. Cl.

| | | |
|---|---|---|
| *H04W 4/80* | (2018.01) | |
| *H04W 12/02* | (2009.01) | |
| *H04W 12/04* | (2009.01) | |
| *H02J 7/02* | (2016.01) | |
| *H02J 50/80* | (2016.01) | |
| *G06F 1/26* | (2006.01) | |
| *H04L 9/06* | (2006.01) | |
| *H04L 9/32* | (2006.01) | |

(52) U.S. Cl.
CPC ......... *H04L 9/0643* (2013.01); *H04L 9/3239* (2013.01); *H04W 4/80* (2018.02); *H04W 12/02* (2013.01); *H04W 12/04* (2013.01); *H04L 2209/80* (2013.01)

(56) References Cited

U.S. PATENT DOCUMENTS

| | | |
|---|---|---|
| 2009/0206165 A1 | 8/2009 | Laackmann et al. |
| 2010/0201310 A1* | 8/2010 | Vorenkamp ............ G06Q 30/04 320/108 |
| 2012/0244822 A1 | 9/2012 | Kim et al. |
| 2012/0299391 A1* | 11/2012 | Tanabe ................... H02J 17/00 307/104 |
| 2013/0099587 A1 | 4/2013 | Lou et al. |
| 2013/0257365 A1* | 10/2013 | Redding ................ H02J 5/005 320/108 |
| 2014/0225458 A1* | 8/2014 | Rehm ..................... H02J 5/005 307/149 |

FOREIGN PATENT DOCUMENTS

| | | |
|---|---|---|
| EP | 2058916 A1 | 5/2009 |
| EP | 2713473 A2 | 4/2014 |

OTHER PUBLICATIONS

International Search Report and Written Opinion issued in PCT Application No. PCT/CN2014/077985, dated Feb. 27, 2015, 14 pages.

International Preliminary Report on Patentability and Written Opinion issued in PCT Application No. PCT/CN2014/077985, dated Nov. 22, 2016, 5 pages.

A4WP-S-0001 v1.2.1, "A4WP Wireless Power Transfer System Baseline System Specification (BSS)". Alliance for Wireless Power, Mar. 14, 2014, 98 pages.

Extended European Search Report issued in European Application No. 14892828.6, dated Oct. 10, 2017, 9 pages.

\* cited by examiner

```
Receive power at a Power Receiving Unit (PRU), for wireless
power transfer, from a Power Transmitting Unit (PTU) over
an inductive resonant coupling link, wherein the power is
modulated to provide a first type of signaling between the
PRU and the PTU over the resonant coupling link

710
```

↓

```
Establish a second type of signaling between the PRU and the
PTU over a wireless communication link

720
```

↓

```
Receive a random number, generated by the PTU, over the
resonant coupling link

730
```

↓

```
Calculate an encoded response based on the random number
and on an identifier associated with the PRU

740
```

↓

```
Transmit the encoded response to the PTU over the wireless
communication link, for verification by the PTU

FIG. 8 ical resonance, as is used, for example, in the

WIRELESS POWER TRANSFER WITH IMPROVED DEVICE IDENTIFICATION AND SIGNALING LINK SECURITY

FIELD

The present disclosure relates to wireless power transfer, and more particularly, to wireless power transfer with improved identification of the power receiving device and establishment of a secure signaling link between the power transmitting device and the power receiving device.

BACKGROUND

Wireless power transfer to devices (including wireless charging) such as smart phones, tablets, personal digital assistants and other mobile platforms, is becoming increasingly common. Typically, the devices receiving the wireless power (or the device to be charged) are placed on a power transmitting platform (like a charging pad) that includes a Power Transmitting Unit (PTU). The PTU provides power to the devices, wirelessly, through inductive coupling (including magnetic resonance, as is used, for example, in the Rezence® wireless power transfer technology) of an electromagnetic field between the devices. A Power Receiving Unit (PRU) in the device is configured to receive this inductive power and use it to charge the device. An initial communication may be established between the PTU and the PRU through modulation of the inductive electromagnetic field. Generally, after the initial communication is established, a secondary communication mechanism, which may be more efficient, is employed to exchange further information and negotiate power transfer parameters, etc. The secondary communication may be through a wireless connection such as, for example Bluetooth®.

A PTU may be configured to support simultaneous power transfer to (and communication with) multiple PRUs. Additionally, in some environments, there may be multiple PTUs in operation. PRUs are typically identified to the PTU through a PRU identification number that may be transmitted, for example, over the wireless connection. It is possible, therefore, that a PRU may present a fraudulent identification to the PTU or that a PTU may inadvertently detect a PRU that is being charged by another PTU. There is generally no reliable method for a PTU to verify that it is communicating with a PRU that is located on top of it or otherwise within range of the inductive coupling. Additionally, the wireless connection is not encrypted and may therefore be snooped by other devices, thus preventing the transmission of confidential or sensitive information between the PTU and the PRU.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems, devices, methods and computer readable media for wireless power transfer with improved identification of the power receiving device and establishment of a secure signaling link between the power transmitting device and the power receiving device. Power is transmitted over an inductive resonant coupling link between a Power Transmitting Unit (PTU) in the power transmitting device (for example, a charging pad) and a Power Receiving Unit (PRU) in the device that receives the wireless power. The power may be modulated to provide a signaling mechanism capability over the resonant coupling link, in addition to the power transfer function of the link. This signaling mechanism is typically accessible only to devices placed on (or in relatively close proximity to) the PTU and is therefore a relatively secure, although generally less efficient method for communication. A second, more efficient, signaling mechanism may also be provided between the PTU and PRU, such as, for example a Bluetooth® connection, which, unless encrypted, may be subject to snooping by other devices in the vicinity.

The PTU may be configured to generate and transmit a random or pseudo-random number to the PRU using the first signaling mechanism (power modulation). The PRU may be configured to generate an encoded or encrypted response based on a combination of this random number and an identification number that is associated with the PRU. The encoded response along with the PRU identification number may then be transmitted back to the PTU using the second signaling mechanism. The PTU, which retains a stored copy of the random number that it previously created, and which now also has access to the PRU identification number, may generate a local copy of the encoded response for comparison to the copy of the encoded response received from the PRU. A comparison match may be used to verify that the PRU received the random number transmission and therefore is in proximity to the PTU. This verification may also enable the use of the random number as a shared secret between the PTU and PRU to establish encryption on the second signaling mechanism for future communications, which may thus be secured in addition to providing relatively more efficient communication.

Figure 1:
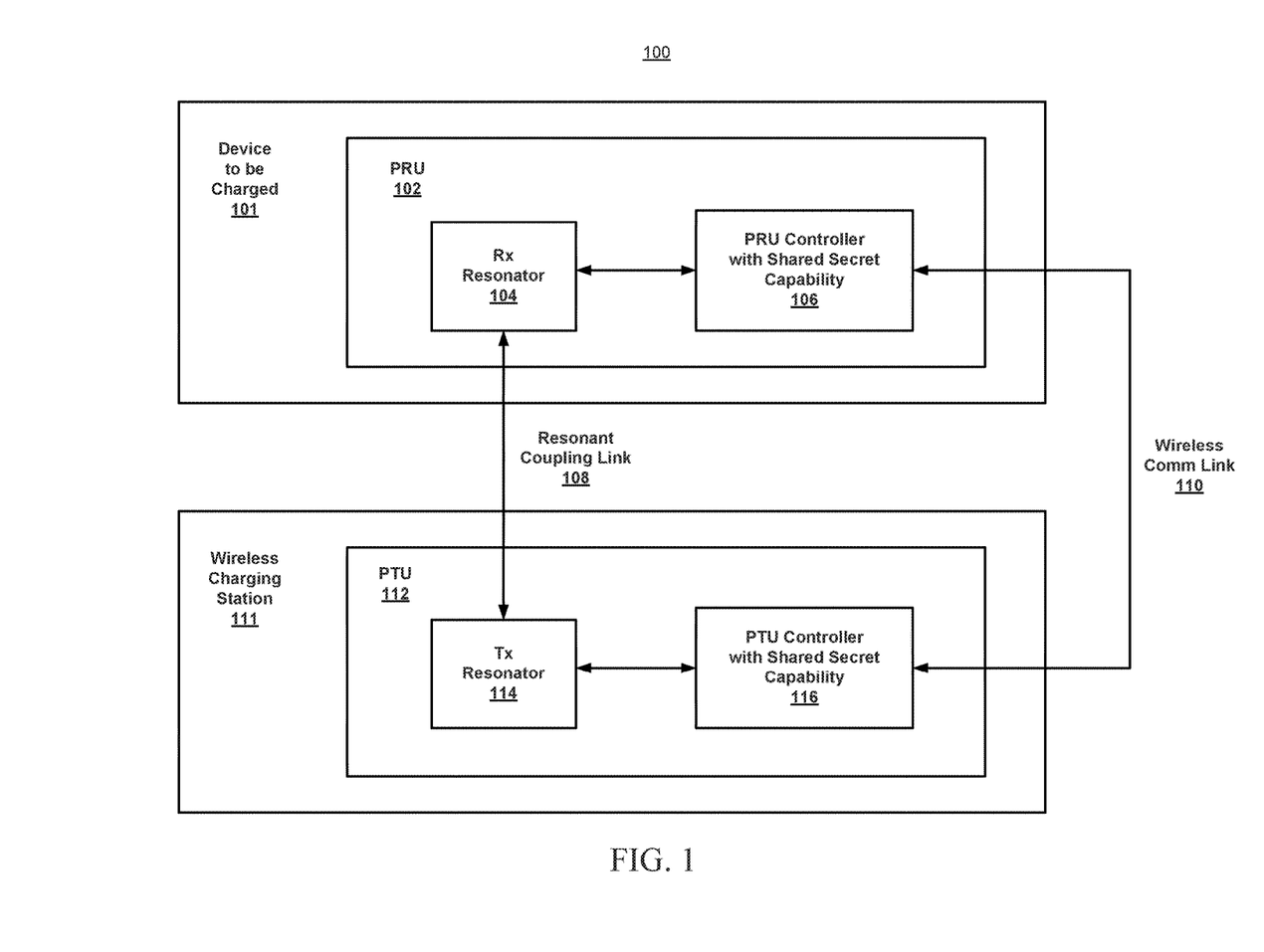
FIG. 1 illustrates a top level system diagram of one example embodiment consistent with the present disclosure.

FIG. 1 illustrates a top level system diagram 100 of one example embodiment consistent with the present disclosure. A device to be charged 101 may be located in relatively close proximity to a wireless charging station 111, for example placed on top of a charging platform of the station. The device to be charged 101 may be, for example, a smart phone, smart tablet, personal digital assistant (PDA), mobile Internet device (MID), convertible tablet, notebook or laptop computer, etc. It will be appreciated that many other configurations may be employed to locate the device 101 in relatively close proximity to the charging station 111, such as, for example, a stacking arrangement, a side-by-side arrangement, locating the device within the charger or locating the charger within the device.

The device to be charged 101 is shown to include a PRU 102 which may further include receive (Rx) resonator circuitry 104 and a PRU controller module 106. The PRU controller module 106 may be configured to employ shared secret capabilities, as will be described in greater detail below. Similarly, the wireless charging station 111 is shown to include a PTU 112 which may further include transmit (Tx) resonator circuitry 114 and a PTU controller module 116. The PTU controller module 116 may also be configured to employ shared secret capabilities.

The Rx resonator 104 and Tx Resonator 114 may be configured to transmit power between the station 111 and the device 101 over a resonant inductive coupling link 108. The power transmission may also be modulated to provide signaling capabilities. In some embodiments, power transmission and signaling over the resonant coupling link may conform to an Alliance for Wireless Power (A4WP) system standard. The PRU 102 and PTU 112 may also be configured to communicate over a wireless link 110, such as, for example a Bluetooth® Low Energy Link (BLE) or other suitable type of wireless communication link.

Figure 2:
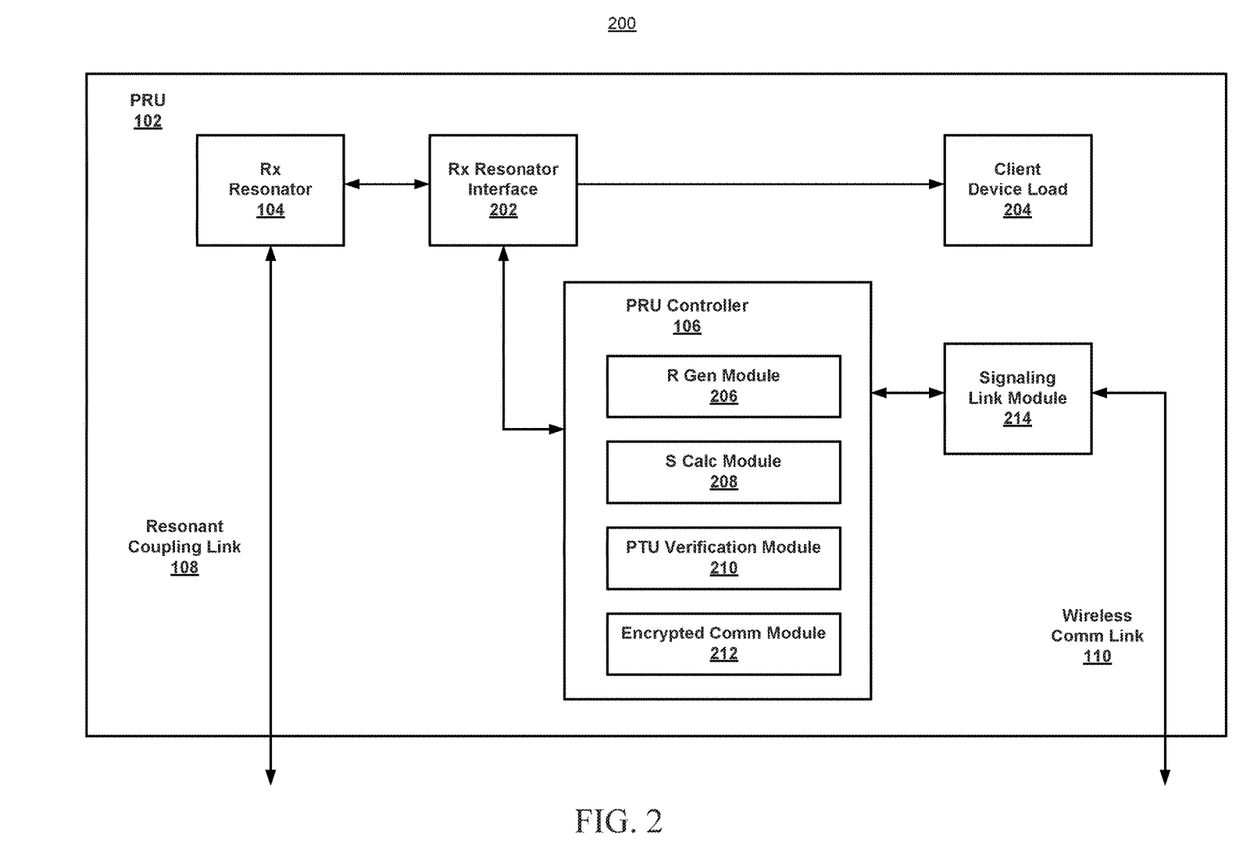
FIG. 2 illustrates a block diagram of one example embodiment consistent with the present disclosure.

FIG. 2 illustrates a block diagram 200 of one example embodiment consistent with the present disclosure. The PRU 102 is shown in greater detail to include Rx resonator circuit 104, Rx resonator interface module 202, client device load 204, PRU controller module 106 and signaling link module 214. The PRU controller module 106 may further include random number (R) generator module 206, encoded response (S) calculation module 208, PTU verification module 210 and encrypted communications module 212.

The Rx resonator 104 may be configured to receive power from the PTU 112 of the wireless charging station 111 over the resonant inductive coupling link 108. The Rx resonator interface 202 may be configured to deliver the received power to the client device load, for example a battery of the device, to be charged or re-charged. The Rx resonator interface 202 may also be configured to detect modulation of the received power and provide the signal associated with that modulation to the PRU controller 106.

In some embodiments, the Rx resonator may also be configured to transmit modulated power over the resonant inductive coupling link 108 to PTU 112, for example to privately communicate with the PTU as will be further explained below. In such a circumstance, the Rx resonator interface 202 may drive the Rx resonator, under control of the PRU controller 106, to apply modulation to the signal to be transmitted to the PTU 112.

The operations of the PRU controller 106, including component modules 206, 208, 210 and 212, will be explained in greater detail below, particularly in connection with the discussions referencing the flowcharts of FIGS. 4, 5 and 6.

Signaling link module 214 may be configured to provide wireless communication between PRU 102 and PTU 112, for example in accordance with a wireless protocol such as BLE. The wireless communication may be unencrypted or encrypted and may switch between the two modes.

Figure 3:
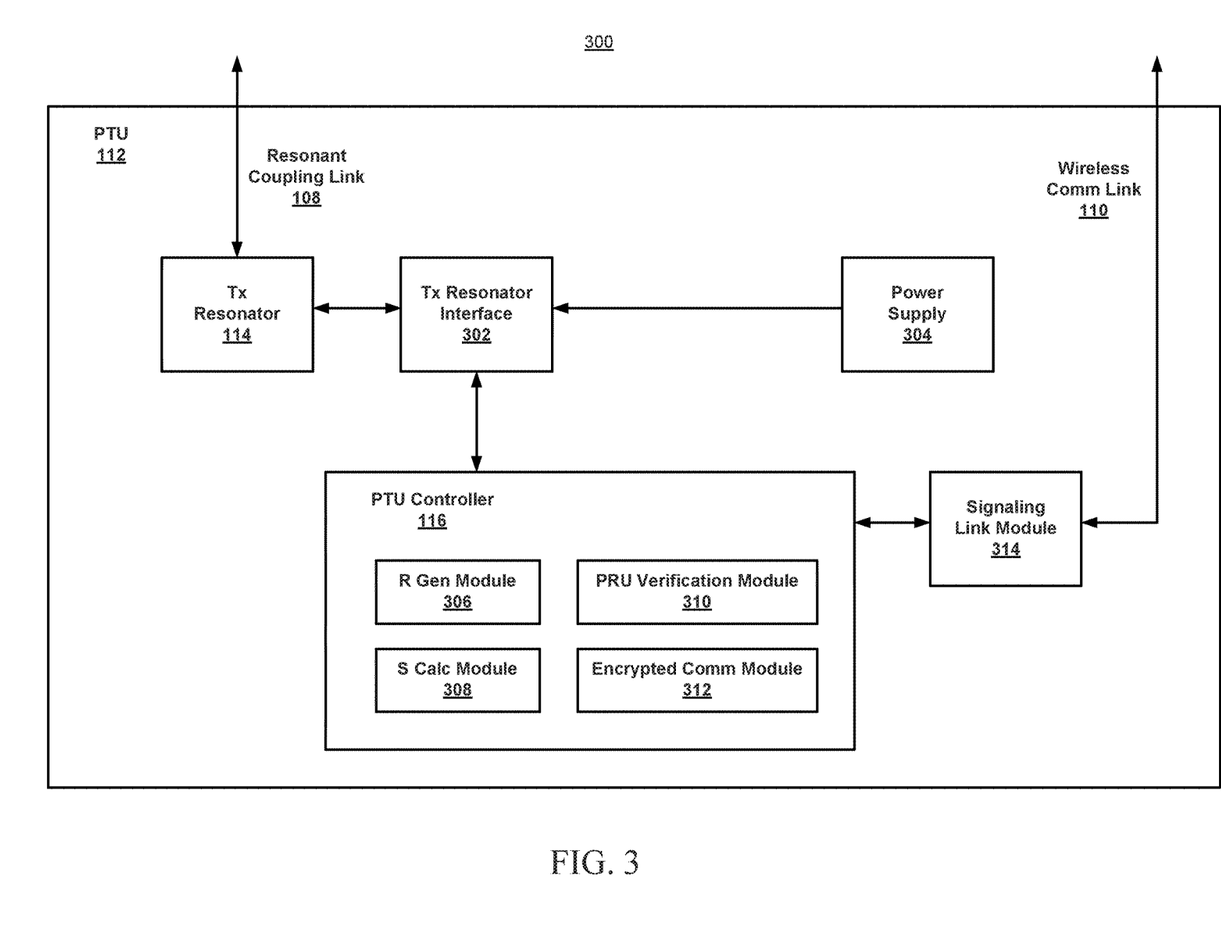
FIG. 3 illustrates a block diagram of another example embodiment consistent with the present disclosure.

FIG. 3 illustrates a block diagram 300 of another example embodiment consistent with the present disclosure. The PTU 112 is shown in greater detail to include Tx resonator circuit 114, Tx resonator interface module 302, power supply 304, PTU controller module 116 and signaling link module 314. The PTU controller module 116 may further include random number (R) generator module 306, encoded response (S) calculation module 308, PRU verification module 310 and encrypted communications module 312.

The Tx resonator 114 may be configured to transmit power to the PRU 102 of the device to be charged 101 over the resonant inductive coupling link 108. The Tx resonator interface 302 may be configured to provide power from power supply 304 to the Tx resonator 114. The Tx resonator interface 302 may also be configured to drive the Tx resonator with a modulating signal provided by the PTU controller 116.

In some embodiments, the Tx resonator may also be configured to receive modulated power over the resonant inductive coupling link 108 from PRU 102, for example to privately communicate with the PRU as will be further explained below. In such a circumstance, the Tx resonator interface 302 may detect modulation of the received power and provide the signal associated with that modulation to the PTU controller 116.

The operations of the PTU controller 106, including component modules 306, 308, 310 and 312, will be explained in greater detail below, particularly in connection with the discussions referencing the flowcharts of FIGS. 4, 5 and 6.

Signaling link module 314 may be configured to provide wireless communication between PRU 102 and PTU 112, for example in accordance with a wireless protocol such as BLE. The wireless communication may be unencrypted or encrypted and may switch between the two modes.

Figure 4:
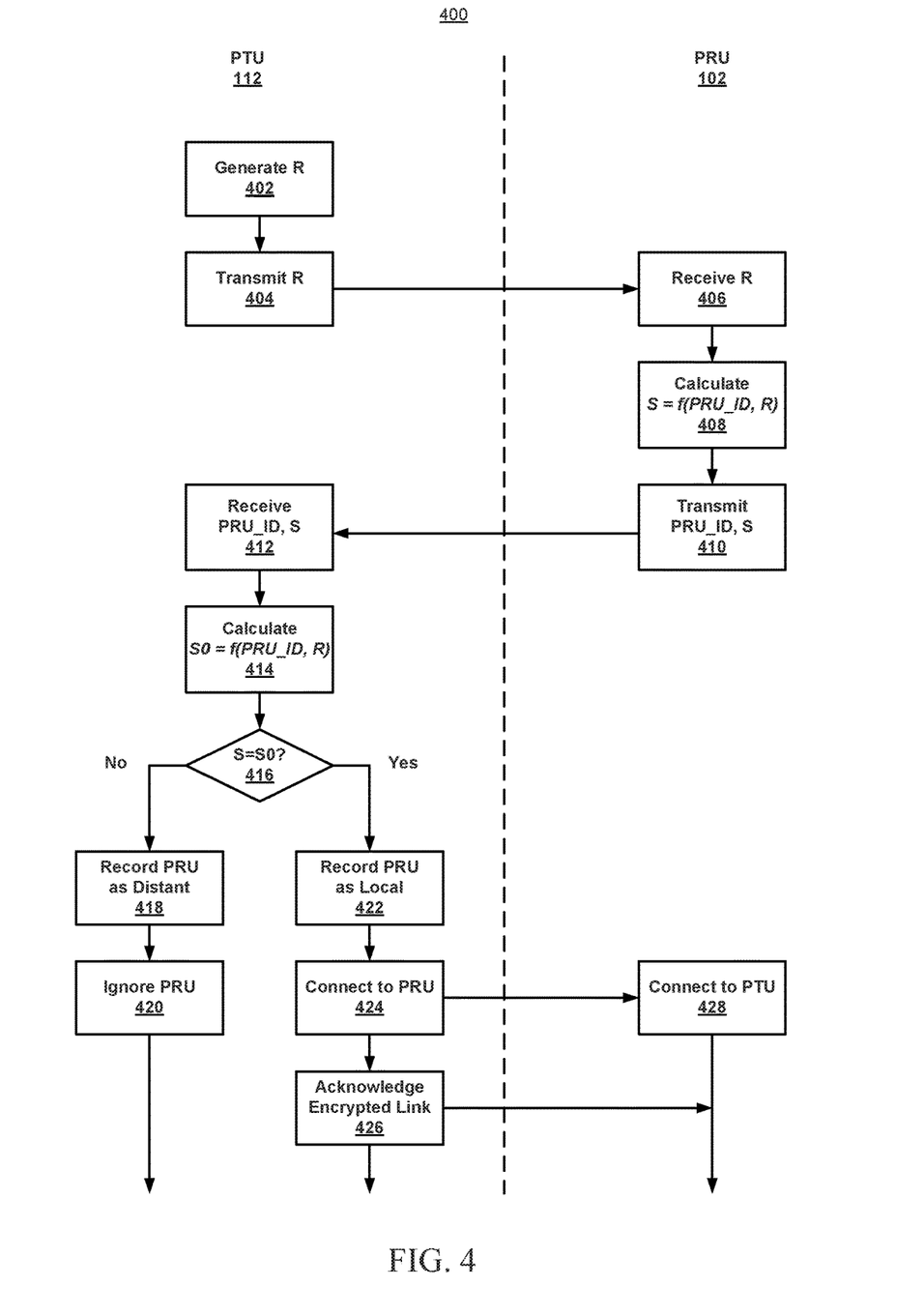
FIG. 4 illustrates a flowchart of operations of one example embodiment consistent with the present disclosure.

FIG. 4 illustrates a flowchart of operations 400 of one example embodiment consistent with the present disclosure. At operation 402, the PTU generates a random or pseudo-random number (R), for example using R generation module 306. In some embodiments, the length of the R value may be in the range of 4 to 6 bytes, providing a brute-force search probability of success in the range of $2.3 \times 10^{-10}$ to $3.6 \times 10^{-15}$ respectively. New values of R may be generated periodically, for example once every hour, or at any other suitable interval.

At operations 404 and 406, R is transmitted from the PTU and received by the PRU over the resonant coupling link, for example through resonators 114 and 104 respectively. The R value may be encoded in the transmitted power through load modulation or any other suitable mechanism. In a wireless power transfer system that conforms to the A4WP standard, R may be encoded in the "long beacon" and/or the "power beacon." Use of the resonant coupling link 108 will generally ensure that only a PRU positioned on the charging pad (e.g., a PRU in close proximity to the PTU) will be able to learn the R value.

At operation 408, the PRU calculates an encoded response (S) that is a function of both the received R value and an identification number of the PRU (PRU_ID). S may be calculated, for example, by the S calculation module 208. In some embodiments, S may be calculated using a hash algorithm, such as, for example, the Secure Hash Algorithm-1 (SHA-1) encryption function/algorithm. At operations 410 and 412, both the calculated S and the PRU_ID are transmitted from the PRU and received by the PTU. These values may be sent over the wireless communications link 110. In some embodiments, the link 110 may conform to the BLE standard and the S and PRU_ID values may be sent in an "advertisement packet."

At operation 414, the PTU may calculate a local copy (S0) of the encoded response based on R and the received PRU_ID, for example using calculation module 308. The local copy S0 is compared to the received value of S at operation 416, for example using PRU verification module 310. If S0 matches S, then the PTU has verified that the PRU is located on the PTU and this status may be recorded as such, at operation 422. The PTU and PRU may then proceed to negotiate/establish a connection, operations 424 and 428, typically using the wireless communication link 110. In some embodiments, the connection may be established in accordance with standard A4WP operations. Additionally, if S0 matches S, the PTU may acknowledge to the PRU, at operation 426, that an encrypted communication link may be established. Encrypted communications modules 313 and 212 may be configured to use R as a shared secret to encrypt the data that is transferred over the wireless communications link 110 (or if possible at that time, the establishment of a secure BLE link). This will allow for the future exchange of confidential information between the PTU and PRU over the BLE, including security tokens, passwords and the like.

In the event that S0 does not match S, the PTU may assume that the PRU is not located on the PTU and may therefore record the PRU status as "distant," at operation 418. Further contacts from the PRU may be ignored, operation 420.

In some embodiments, if S is not present in the received packet, this may indicate that the PRU is not configured to use the shared secret capabilities described herein. In such case, the PTU may proceed using a conventional procedure (e.g., standard A4WP operations) to provide backward compatibility.

It will be appreciated that a nearby (rogue) PRU may be able to eavesdrop on the transmission of S and the PRU_ID of the legitimate PRU over an unencrypted BLE, and thereby attempt to fake the identity of that legitimate PRU. However, the fact that R is never transmitted over the BLE ensures that the rogue PRU cannot obtain R and therefore cannot compromise the encrypted communications link that is subsequently established between the PTU and the legitimate PRU. Given a typical BLE transmission rate of 0.27 Mbit/sec and a 6 byte random number, an attack based on the testing of all possible values of R would take approximately 33 years. Additionally, a second challenge/response procedure, as described below in connection with FIG. 5, may be used to further verify that a particular PRU knows the correct value of R.

Figure 5:
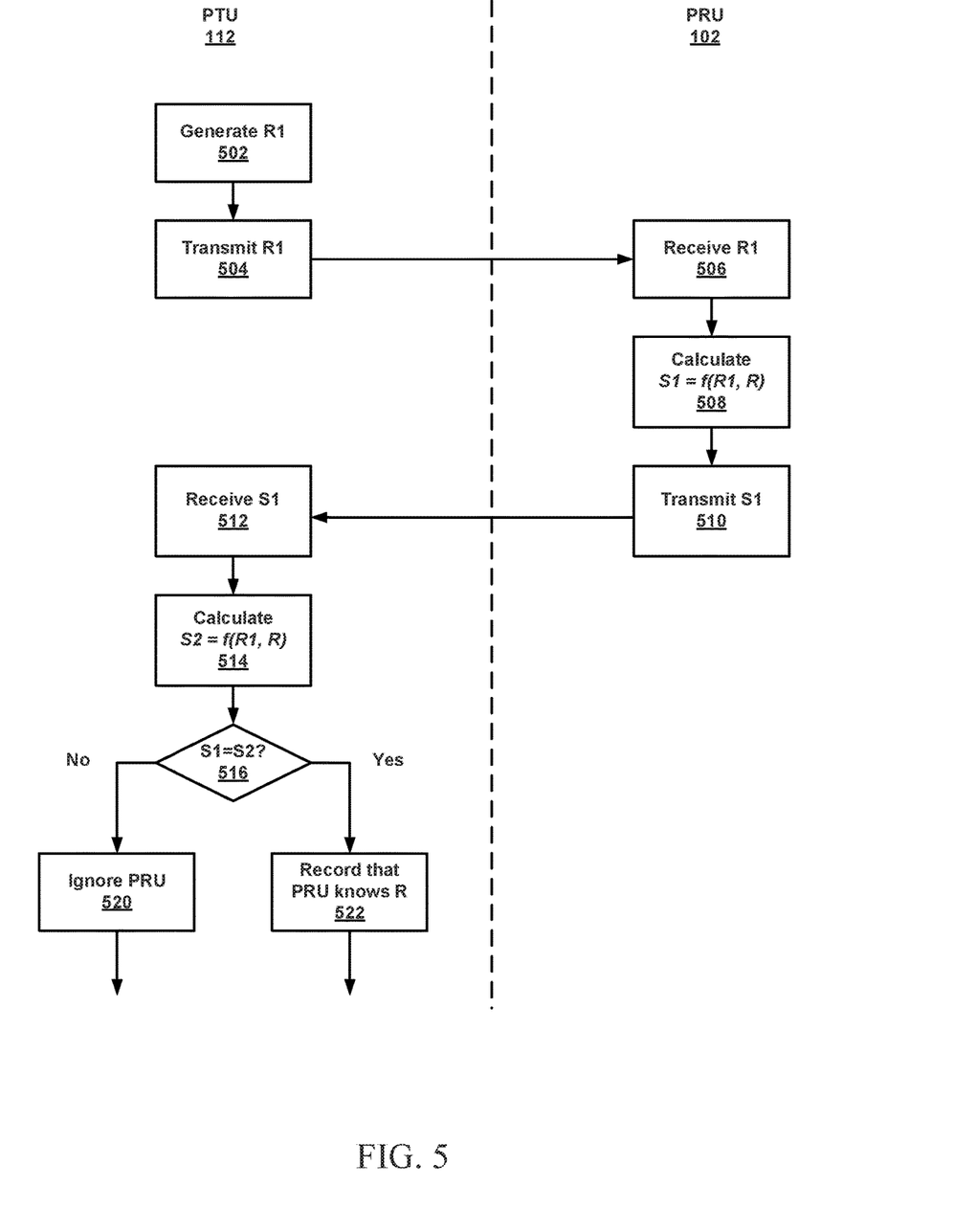
FIG. 5 illustrates a flowchart of operations of another example embodiment consistent with the present disclosure.

FIG. 5 illustrates a flowchart of operations 500 of another example embodiment consistent with the present disclosure. An additional challenge/response procedure begins at operation 502 where the PTU generates a second random number (R1). At operations 504 and 506, R1 is transmitted from the PTU and received by the PRU over the wireless communications link, for example using BLE.

At operation 508, the PRU calculates a second encoded response (S1) that is a function of both the previous received R value and the newly received R1. At operations 510 and 512, the newly calculated S1 value is transmitted from the PRU and received by the PTU, for example using BLE over link 110. At operation 514, the PTU may calculate a local copy (S2) of the second encoded response based on R and R1 The local copy S2 is compared to the received value of S1 at operation 516. If S2 matches S1, then the PTU has additional verification that the PRU is located on the PTU and this status may be recorded as such, at operation 522. In the event that S2 does not match S1, the PTU may then ignore further contact with the PRU, operation 520. It will be noted that this additional verification is accomplished without the re-transmission of the PRU_ID, thus decreasing the likelihood of a rogue PRU faking a response.

Figure 6:
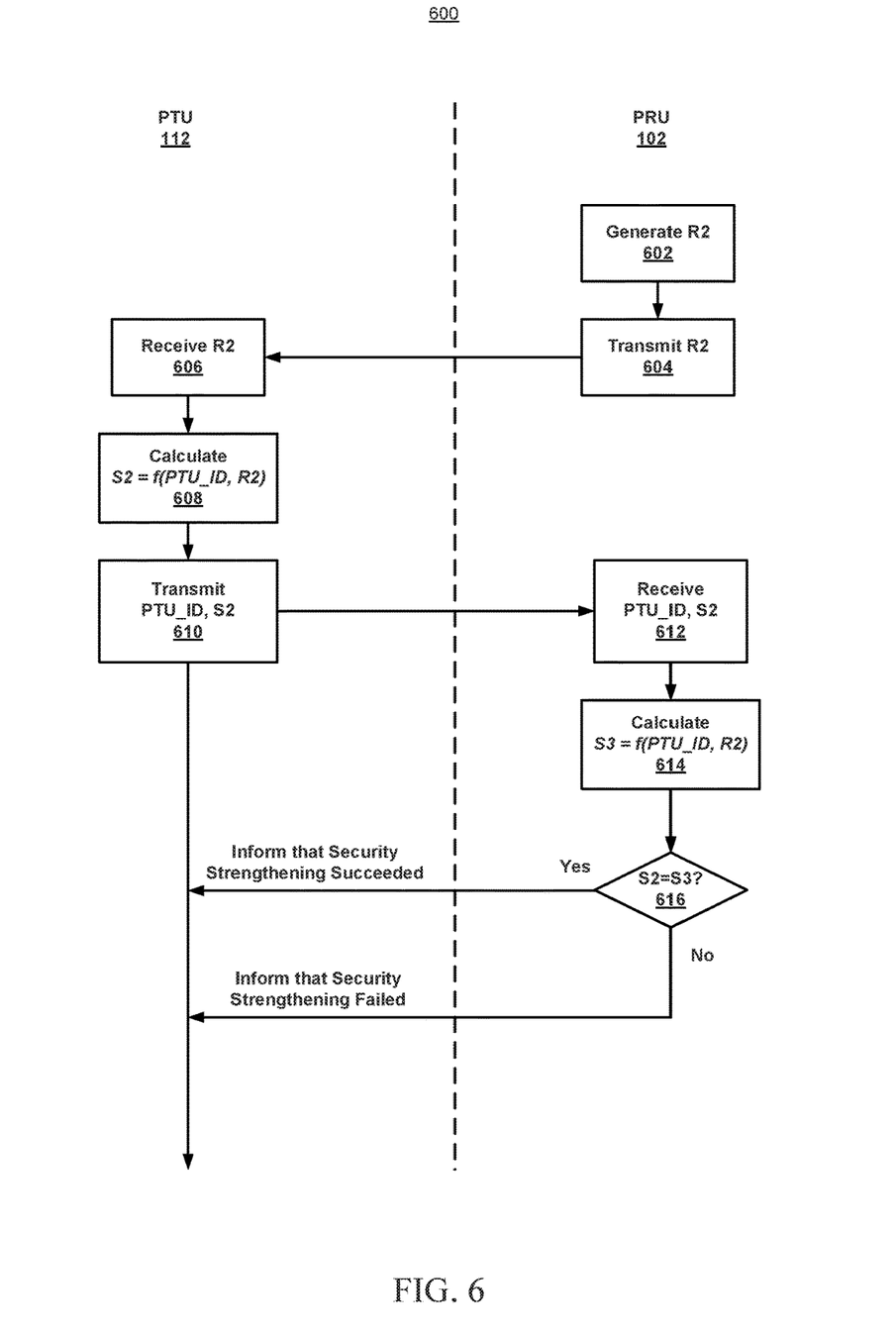
FIG. 6 illustrates a flowchart of operations of another example embodiment consistent with the present disclosure.

FIG. 6 illustrates a flowchart of operations 600 of another example embodiment consistent with the present disclosure. Yet another challenge/response procedure may be performed in the reverse direction to strengthen the security link. This may be useful because a second PRU located on the PTU, along with the first PRU, will be able to receive the random number transmitted by the PTU over the resonant coupling link during the procedure described above in connection with FIG. 4. Performing an additional challenge/response in the reverse direction prevents the second PRU from eavesdropping when the first PRU transmits a random number to the PTU over the resonant coupling link, since the two PRUs are not oriented in a manner (e.g., "face-to-face") that would permit inductive resonant coupling between them.

At operation 602, the PRU generates a random number (R2), for example using R generation module 206. At operations 604 and 606, R2 is transmitted from the PRU and received by the PTU over the resonant coupling link, for example through resonators 114 and 104 respectively. The R2 value may be encoded through load modulation or any other suitable mechanism. Use of the resonant coupling link 108 will generally ensure that a second PRU positioned on the charging pad will not be able to detect the R2 value.

At operation 608, the PTU calculates an encoded response (S2) that is a function of both the received R2 value and an identification number of the PTU (PTU_ID). S2 may be calculated, for example, by the calculation module 308. At operations 610 and 612, both the calculated S2 and the PTU_ID are transmitted from the PTU and received by the PRU. These values may be sent over the wireless communications link 110, for example in a BLE packet.

At operation 614, the PRU may calculate a local copy (S3) of the encoded response based on R2 and the received PTU_ID, for example using calculation module 208. The local copy S3 is compared to the received value of S2 at operation 616, for example using PTU verification module 210. If S3 matches S2, then the PRU may inform the PTU that security strengthening has succeeded, otherwise the PRU may inform the PTU that security strengthening has failed and the PTU may take any appropriate action based on this information.

Figure 7:
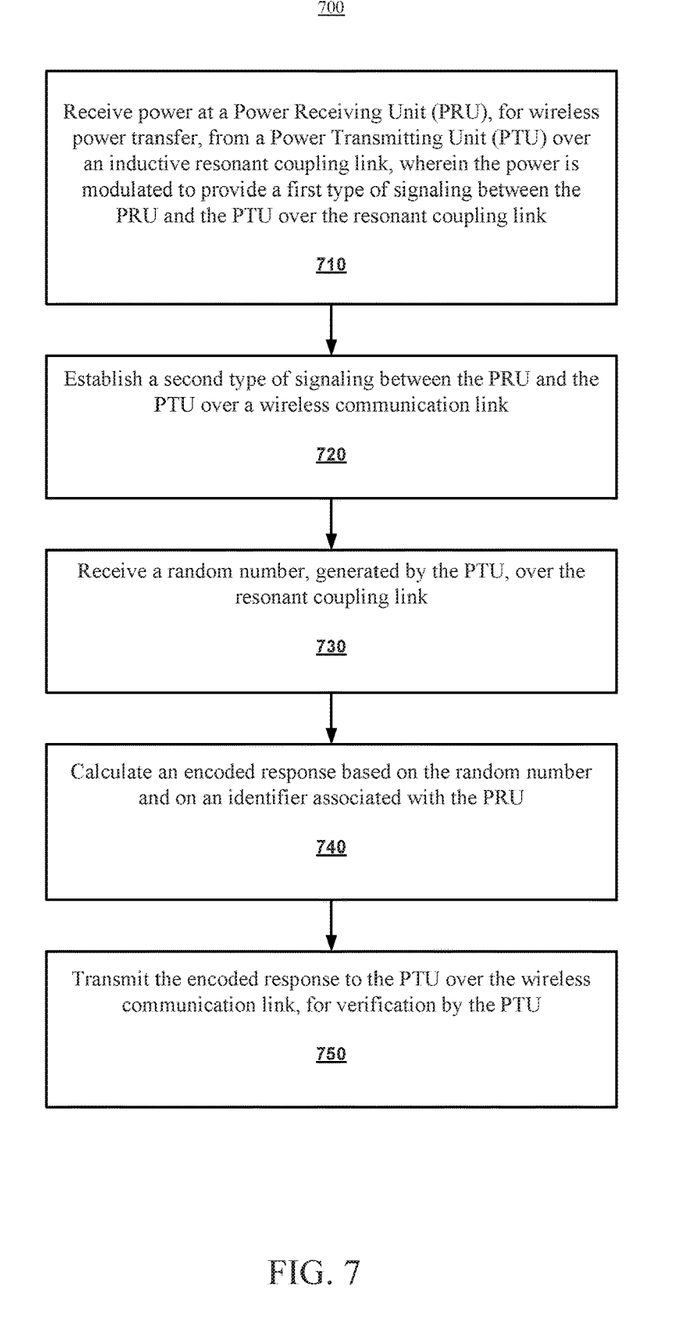
FIG. 7 illustrates a flowchart of operations of another example embodiment consistent with the present disclosure.

FIG. 7 illustrates a flowchart of operations 700 of another example embodiment consistent with the present disclosure. At operation 710, power is received at a PRU, for wireless power transfer, from a PTU, over an inductive resonant coupling link. The power is modulated to provide a first type of signaling between the PRU and the PTU over the resonant coupling link. At operation 720, a second type of signaling between the PRU and the PTU is established over a wireless communication link. At operation 730, a random number, generated by the PTU, is received by the PRU over the resonant coupling link. At operation 740, an encoded response is calculated based on the random number and on an identifier associated with the PRU. At operation 750, the encoded response is transmitted to the PTU over the wireless communication link, for verification by the PTU.

Figure 8:
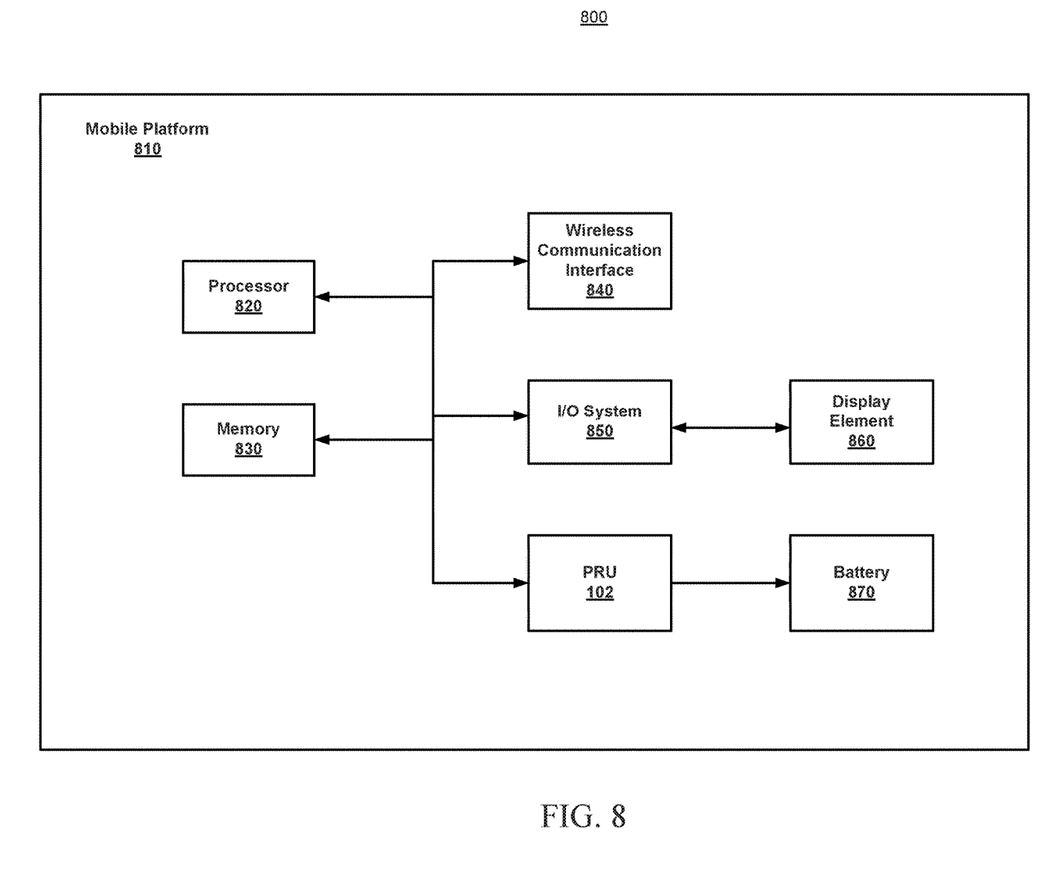
FIG. 8 illustrates a system diagram of a platform of another example embodiment consistent with the present disclosure.

FIG. 8 illustrates a system diagram 800 of one example embodiment consistent with the present disclosure. The system 800 may be a mobile platform 810 or computing device such as, for example, a smart phone, smart tablet, personal digital assistant (PDA), mobile Internet device (MID), convertible tablet, notebook or laptop computer, or any other device. The device may generally present various interfaces to a user via a display element 860 such as, for example, a touch screen, liquid crystal display (LCD) or any other suitable display type.

The system 800 is shown to include a processor 820. In some embodiments, processor 820 may be implemented as any number of processor cores. The processor (or processor cores) may be any type of processor, such as, for example, a micro-processor, an embedded processor, a digital signal processor (DSP), a network processor, a field programmable gate array or other device configured to execute code. Processor 820 may be a single-threaded core or, a multi-threaded core in that it may include more than one hardware thread context (or "logical processor") per core. System 800 is also shown to include a memory 830 coupled to the processor 820. The memory 830 may be any of a wide variety of memories (including various layers of memory hierarchy and/or memory caches) as are known or otherwise available to those of skill in the art. System 800 is also shown to include a PRU 102 configured for wireless power transfer to battery 870, or other power storage mechanism, of the platform, as described previously.

System 800 is also shown to include an input/output (IO) system or controller 850 which may be configured to enable or manage data communication between processor 820 and other elements of system 800 or other elements (not shown) external to system 800. System 800 may also include a wireless communication interface 840 configured to enable wireless communication between system 800 and any external entity, including, for example, a PTU. The wireless communications may conform to or otherwise be compatible with any existing or yet to be developed communication standards including Bluetooth®, Wi-Fi and mobile phone communication standards.

It will be appreciated that in some embodiments, the various components of the system 800 may be combined in a system-on-a-chip (SoC) architecture. In some embodiments, the components may be hardware components, firmware components, software components or any suitable combination of hardware, firmware or software.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all sub-combinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may include, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides systems, devices, methods and computer readable media for wireless power transfer with improved identification of the power receiving device and establishment of a secure signaling link between the power transmitting device and the power receiving device. The following examples pertain to further embodiments.

According to example 1 there is provided a Power Receiving Unit (PRU) for wireless power transfer to a device. The PRU may include a receive resonator module to receive power from a Power Transmitting Unit (PTU) over an inductive resonant coupling link, the power provided for the wireless power transfer, and the power is further modulated to provide a first type of signaling between the PRU and the PTU over the resonant coupling link. The PRU of this example may also include a signaling link communication module to provide a second type of signaling between the PRU and the PTU over a wireless communication link. The PRU of this example may further include a controller module to: receive a random number, generated by the PTU, over the resonant coupling link; calculate an encoded response based on the random number and on an identifier associated with the PRU (PRU_ID); and transmit the encoded response to the PTU over the wireless communication link, for verification by the PTU.

Example 2 may include the elements of the foregoing example, and the controller module is further to receive an acknowledgement from the PTU of the verification and that the random number is a shared secret for encryption of further communications over the wireless communication link.

Example 3 may include the elements of the foregoing examples, and the first type of signaling over the resonant coupling link conforms to an Alliance for Wireless Power (A4WP) system standard and the random number is received in a power beacon of the first type of signaling.

Example 4 may include the elements of the foregoing examples, and the second type of signaling over the wireless communication link conforms to a Bluetooth® Low Energy (BLE) system standard and the encoded response is transmitted in a BLE advertisement packet.

Example 5 may include the elements of the foregoing examples, and the encoded response is calculated based on a hash algorithm and/or encryption function.

Example 6 may include the elements of the foregoing examples, and the hash algorithm is a Secure Hash Algorithm (SHA-1) encryption function.

Example 7 may include the elements of the foregoing examples, and the controller module is further to: receive a second random number, generated by the PTU, over the wireless communication link; calculate a second encoded response based on the random number and on the second random number; and transmit the second encoded response to the PTU over the wireless communication link, for further verification by the PTU.

Example 8 may include the elements of the foregoing examples, and the controller module is further to: generate a second random number for transmission to the PTU over the resonant coupling link, and the PTU calculates a second encoded response based on the second random number and on an identifier associated with the PTU (PTU_ID); receive the second encoded response and the PTU_ID from the PTU over the wireless communication link; calculate a third encoded response based on the second random number and the received PTU_ID; and verify that the received second encoded response matches the calculated third encoded response.

Example 9 may include the elements of the foregoing examples, and the device is a smart phone, smart tablet, notebook or laptop computer.

According to example 10 there is provided a Power Transmitting Unit (PTU) to provide wireless power transfer through a Power Receiving Unit (PRU) of a device. The PTU may include a transmit resonator module to transmit power to the PRU over an inductive resonant coupling link, the power provided for the wireless power transfer, and the power is further modulated to provide a first type of signaling between the PTU and the PRU over the resonant coupling link. The PTU of this example may also include a signaling link communication module to provide a second type of signaling between the PTU and the PRU over a wireless communication link. The PTU of this example may further include a controller module to: generate a random number for transmission to the PRU over the resonant coupling link, and the PRU calculates an encoded response based on the random number and on an identifier associated with the PRU (PRU_ID); receive the encoded response and the PRU_ID from the PRU over the wireless communication link; calculate a second encoded response based on the random number and the received PRU_ID; and verify that the received encoded response matches the calculated second encoded response.

Example 11 may include the elements of the foregoing example, and the controller module, in response to the verification of the match, is further to transmit an acknowledgement to the PRU to indicate that the random number is a shared secret for encryption of further communications over the wireless communication link.

Example 12 may include the elements of the foregoing examples, and the controller module, in response to a failure of the verification of the match, is further to record a status of the PRU as distant.

Example 13 may include the elements of the foregoing examples, and the first type of signaling over the resonant coupling link conforms to an Alliance for Wireless Power (A4WP) system standard and the random number is received in a power beacon of the first type of signaling.

Example 14 may include the elements of the foregoing examples, and the second type of signaling over the wireless communication link conforms to a Bluetooth® Low Energy (BLE) system standard and the encoded response is transmitted in a BLE advertisement packet.

Example 15 may include the elements of the foregoing examples, and the encoded response is calculated based on a hash algorithm and/or encryption function.

Example 16 may include the elements of the foregoing examples, and the hash algorithm is a Secure Hash Algorithm (SHA-1) encryption function.

Example 17 may include the elements of the foregoing examples, and the controller module is further to: generate a second random number for transmission to the PRU over the wireless communication link, and the PRU calculates a second encoded response based on the random number and the second random number; receive the second encoded response from the PRU over the wireless communication link; calculate a third encoded response based on the random number and the second random number; and verify that the received second encoded response matches the calculated third encoded response.

Example 18 may include the elements of the foregoing examples, and the controller module is further to: receive a second random number from the PRU over the resonant coupling link; calculate a second encoded response based on the second random number and on an identifier associated with the PTU (PTU_ID); and transmit the second encoded response and the PTU_ID to the PRU over the wireless communication link, for verification by the PRU.

According to example 19 there is provided a method for improving security of a Power Receiving Unit (PRU) for wireless power transfer to a device. The method may include receiving power, for the wireless power transfer, from a Power Transmitting Unit (PTU) over an inductive resonant coupling link, and the power is modulated to provide a first type of signaling between the PRU and the PTU over the resonant coupling link. The method of this example may also include establishing a second type of signaling between the PRU and the PTU over a wireless communication link. The method of this example may further include receiving a random number, generated by the PTU, over the resonant coupling link. The method of this example may further include calculating an encoded response based on the random number and on an identifier associated with the PRU (PRU_ID). The method of this example may further include transmitting the encoded response to the PTU over the wireless communication link, for verification by the PTU.

Example 20 may include the elements of the foregoing example, and further includes receiving an acknowledgement from the PTU of the verification; and in response to the received verification, employing the random number as a shared secret for encryption of further communications over the wireless communication link.

Example 21 may include the elements of the foregoing examples, and the first type of signaling over the resonant coupling link conforms to an Alliance for Wireless Power (A4WP) system standard and the random number is received in a power beacon of the first type of signaling.

Example 22 may include the elements of the foregoing examples, and the second type of signaling over the wireless communication link conforms to a Bluetooth® Low Energy (BLE) system standard and the encoded response is transmitted in a BLE advertisement packet.

Example 23 may include the elements of the foregoing examples, and further includes calculating the encoded response based on a hash algorithm and/or encryption function.

Example 24 may include the elements of the foregoing examples, and the hash algorithm is a Secure Hash Algorithm (SHA-1) encryption function.

Example 25 may include the elements of the foregoing examples, and further includes receiving a second random number, generated by the PTU, over the wireless communication link; calculating a second encoded response based on the random number and on the second random number; and transmitting the second encoded response to the PTU over the wireless communication link, for further verification by the PTU.

Example 26 may include the elements of the foregoing examples, and further includes generating a second random number for transmission to the PTU over the resonant coupling link, and the PTU calculates a second encoded response based on the second random number and on an identifier associated with the PTU (PTU_ID); receiving the second encoded response and the PTU_ID from the PTU over the wireless communication link; calculating a third encoded response based on the second random number and the received PTU_ID; and verifying that the received second encoded response matches the calculated third encoded response.

According to example 27 there is provided a system for improving security of a Power Receiving Unit (PRU) for wireless power transfer to a device. The system may include means for receiving power, for the wireless power transfer, from a Power Transmitting Unit (PTU) over an inductive resonant coupling link, and the power is modulated to provide a first type of signaling between the PRU and the PTU over the resonant coupling link. The system of this example may also include means for establishing a second type of signaling between the PRU and the PTU over a wireless communication link. The system of this example may further include means for receiving a random number, generated by the PTU, over the resonant coupling link. The system of this example may further include means for calculating an encoded response based on the random number and on an identifier associated with the PRU (PRU_ID). The system of this example may further include means for transmitting the encoded response to the PTU over the wireless communication link, for verification by the PTU.

Example 28 may include the elements of the foregoing example, and further includes means for receiving an acknowledgement from the PTU of the verification; and in response to the received verification, means for employing the random number as a shared secret for encryption of further communications over the wireless communication link.

Example 29 may include the elements of the foregoing examples, and the first type of signaling over the resonant coupling link conforms to an Alliance for Wireless Power (A4WP) system standard and the random number is received in a power beacon of the first type of signaling.

Example 30 may include the elements of the foregoing examples, and the second type of signaling over the wireless communication link conforms to a Bluetooth® Low Energy (BLE) system standard and the encoded response is transmitted in a BLE advertisement packet.

Example 31 may include the elements of the foregoing examples, and further includes means for calculating the encoded response based on a hash algorithm and/or encryption function.

Example 32 may include the elements of the foregoing examples, and the hash algorithm is a Secure Hash Algorithm (SHA-1) encryption function.

Example 33 may include the elements of the foregoing examples, and further includes means for receiving a second random number, generated by the PTU, over the wireless communication link; means for calculating a second encoded response based on the random number and on the second random number; and means for transmitting the second encoded response to the PTU over the wireless communication link, for further verification by the PTU.

Example 34 may include the elements of the foregoing examples, and further includes means for generating a second random number for transmission to the PTU over the resonant coupling link, and the PTU calculates a second encoded response based on the second random number and on an identifier associated with the PTU (PTU_ID); means for receiving the second encoded response and the PTU_ID from the PTU over the wireless communication link; means for calculating a third encoded response based on the second random number and the received PTU_ID; and means for verifying that the received second encoded response matches the calculated third encoded response.

According to another example there is provided at least one computer-readable storage medium having instructions stored thereon which when executed by a processor, cause the processor to perform the operations of the method as described in any of the examples above.

According to another example there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A Power Receiving Unit (PRU) for wireless power transfer to a device, said PRU comprising:
  receive resonator circuitry to receive power from a Power Transmitting Unit (PTU) over an inductive resonant coupling link, said power provided for said wireless power transfer, wherein said power is further modulated to provide a first type of signaling between said PRU and said PTU over said resonant coupling link;
  signaling link communication circuitry to provide a second type of signaling between said PRU and said PTU over a wireless communication link; and
  controller circuitry to:
    receive a random number, generated by said PTU, over said resonant coupling link;
    determine an encoded response based on said random number and on an identifier associated with said PRU (PRU_ID); and
    transmit said encoded response to said PTU over said wireless communication link, for verification by said PTU.

2. The PRU of claim 1, wherein said controller circuitry is further to receive an acknowledgement from said PTU of said verification and that said random number is a shared secret for encryption of further communications over said wireless communication link.

3. The PRU of claim 1, wherein said first type of signaling over said resonant coupling link conforms to an Alliance for Wireless Power (A4WP) system standard and said random number is received in a power beacon of said first type of signaling.

4. The PRU of claim 1, wherein said second type of signaling over said wireless communication link conforms to a Bluetooth® Low Energy (BLE) system standard and said encoded response is transmitted in a BLE advertisement packet.

5. The PRU of claim 1, wherein said encoded response is determined based on a hash algorithm and/or encryption function.

6. The PRU of claim 5, wherein said hash algorithm is a Secure Hash Algorithm (SHA-1) encryption function.

7. The PRU of claim 1, wherein said controller circuitry is further to:
receive a second random number, generated by said PTU, over said wireless communication link;
determine a second encoded response based on said random number and on said second random number; and
transmit said second encoded response to said PTU over said wireless communication link, for further verification by said PTU.

8. A Power Transmitting Unit (PTU) to provide wireless power transfer through a Power Receiving Unit (PRU) of a device, said PTU comprising:
transmit resonator circuitry to transmit power to said PRU over an inductive resonant coupling link, said power provided for said wireless power transfer, wherein said power is further modulated to provide a first type of signaling between said PTU and said PRU over said resonant coupling link;
signaling link communication circuitry to provide a second type of signaling between said PTU and said PRU over a wireless communication link; and
controller circuitry to:
generate a random number for transmission to said PRU over said resonant coupling link;
receive an encoded response and an identifier associated with said PRU (PRU_ID) from said PRU over said wireless communication link, wherein said encoded response based on said random number and on said PRU_ID;
determine a second encoded response based on said random number and said received PRU_ID; and
verify that said received encoded response matches said determined second encoded response.

9. The PTU of claim 8, wherein said controller circuitry, in response to said verification of said match, is further to transmit an acknowledgement to said PRU to indicate that said random number is a shared secret for encryption of further communications over said wireless communication link.

10. The PTU of claim 8, wherein said controller circuitry, in response to a failure of said verification of said match, is further to record a status of said PRU as distant.

11. The PTU of claim 8, wherein said first type of signaling over said resonant coupling link conforms to an Alliance for Wireless Power (A4WP) system standard and said random number is received in a power beacon of said first type of signaling.

12. The PTU of claim 8, wherein said second type of signaling over said wireless communication link conforms to a Bluetooth® Low Energy (BLE) system standard and said encoded response is transmitted in a BLE advertisement packet.

13. The PTU of claim 8, wherein said encoded response is determined based on a hash algorithm and/or encryption function.

14. The PTU of claim 8, wherein said controller circuitry is further to:
generate a second random number for transmission to said PRU over said wireless communication link;
receive a second encoded response from said PRU over said wireless communication link, wherein said second encoded response based on said random number and said second random number;
determine a third encoded response based on said random number and said second random number; and
verify that said received second encoded response matches said determined third encoded response.

15. The PTU of claim 8, wherein said controller circuitry is further to:
receive a second random number from said PRU over said resonant coupling link;
determine a second encoded response based on said second random number and on an identifier associated with said PTU (PTU_ID); and
transmit said second encoded response and said PTU_ID to said PRU over said wireless communication link, for verification by said PRU.

16. A method for improving security of a Power Receiving Unit (PRU) for wireless power transfer to a device, said method comprising:
receiving power, for said wireless power transfer, from a Power Transmitting Unit (PTU) over an inductive resonant coupling link, wherein said power is modulated to provide a first type of signaling between said PRU and said PTU over said resonant coupling link;
establishing a second type of signaling between said PRU and said PTU over a wireless communication link;
receiving a random number, generated by said PTU, over said resonant coupling link;
determining an encoded response based on said random number and on an identifier associated with said PRU (PRU_ID); and
transmitting said encoded response to said PTU over said wireless communication link, for verification by said PTU.

17. The method of claim 16, further comprising:
receiving an acknowledgement from said PTU of said verification; and
in response to said received verification, employing said random number as a shared secret for encryption of further communications over said wireless communication link.

18. The method of claim 16, further comprising determining said encoded response based on a hash algorithm and/or encryption function.

19. The method of claim 16, further comprising:
receiving a second random number, generated by said PTU, over said wireless communication link;
determining a second encoded response based on said random number and on said second random number; and
transmitting said second encoded response to said PTU over said wireless communication link, for further verification by said PTU.

20. The method of claim 16, further comprising:
generating a second random number for transmission to said PTU over said resonant coupling link;
receiving a second encoded response and an identifier associated with said PTU (PTU_ID) from said PTU over said wireless communication link, wherein said second encoded response based on said second random number and on said PTU_ID;
determining a third encoded response based on said second random number and said received PTU_ID; and
verifying that said received second encoded response matches said determined third encoded response.

21. A non-transitory computer-readable storage device having instructions stored thereon which when executed by a processor result in the following operations for improving security of a Power Receiving Unit (PRU) for wireless power transfer to a device, said operations comprising:

receiving power, for said wireless power transfer, from a Power Transmitting Unit (PTU) over an inductive resonant coupling link, wherein said power is modulated to provide a first type of signaling between said PRU and said PTU over said resonant coupling link;

establishing a second type of signaling between said PRU and said PTU over a wireless communication link;

receiving a random number, generated by said PTU, over said resonant coupling link;

determining an encoded response based on said random number and on an identifier associated with said PRU (PRU_ID); and transmitting said encoded response to said PTU over said wireless communication link, for verification by said PTU.

22. The non-transitory computer-readable storage device of claim 21, further comprising the operations of:

receiving an acknowledgement from said PTU of said verification; and in response to said received verification, employing said random number as a shared secret for encryption of further communications over said wireless communication link.

23. The non-transitory computer-readable storage device of claim 21, further comprising the operation of determining said encoded response based on a hash algorithm and/or encryption function.

24. The non-transitory computer-readable storage device of claim 21, further comprising the operations of:

receiving a second random number, generated by said PTU, over said wireless communication link;

determining a second encoded response based on said random number and on said second random number; and transmitting said second encoded response to said PTU over said wireless communication link, for further verification by said PTU.

25. The non-transitory computer-readable storage device of claim 21, further comprising the operations of:

generating a second random number for transmission to said PTU over said resonant coupling link;

receiving a second encoded response and an identifier associated with said PTU (PTU_ID) from said PTU over said wireless communication link, wherein said second encoded response based on said second random number and on said PTU_ID;

determining a third encoded response based on said second random number and said received PTU_ID; and verifying that said received second encoded response matches said determined third encoded response.

* * * * *